No. 677,872. Patented July 9, 1901.
B. H. LOCKE.
CLUTCH.
(Application filed Nov. 20, 1900.)
(No Model.)
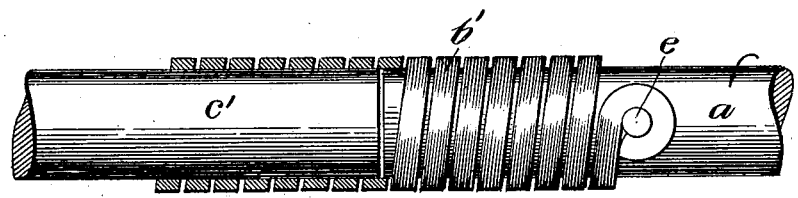
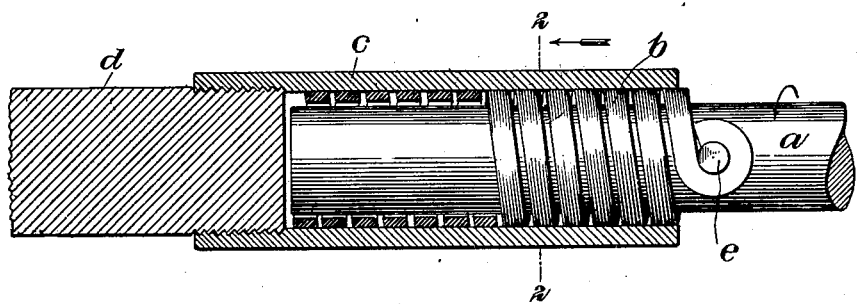
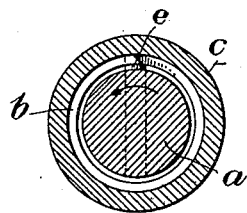
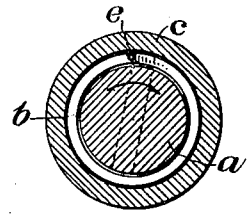
WITNESSES:
INVENTOR
Bradford H. Locke
BY
Redding, Kiddle Greeley
ATTORNEYS
THE NORRIS PETERS CO., PHOTO-LITHO., WASHINGTON, D. C.

UNITED STATES PATENT OFFICE.

BRADFORD H. LOCKE, OF DENVER, COLORADO.

CLUTCH.

SPECIFICATION forming part of Letters Patent No. 677,872, dated July 9, 1901.

Application filed November 20, 1900. Serial No. 37,094. (No model.)

*To all whom it may concern:*

Be it known that I, BRADFORD H. LOCKE, a citizen of the United States, residing in Denver, county of Arapahoe, State of Colorado, have invented certain new and useful Improvements in Clutches, of which the following is a specification, reference being had to the accompanying drawings, forming a part hereof.

This invention has for its object to provide an improved clutch or yielding connection which will serve to transmit the required power under all ordinary conditions of use, but will yield if the driven part of the mechanism to which it is applied is held from movement, permitting the driving part to continue its movement.

The invention will be more fully described hereinafter, with reference to the accompanying drawings, in which it is illustrated as embodied in a convenient and practical form, and in which—

Figure 1 is a view, partly in longitudinal section, of a clutch which embodies the invention. Figs. 2 and 3 are sections on the plane indicated by the line 2 2 of Fig. 1, Fig. 2 representing the section as seen in the direction of the arrow on Fig. 1 and showing the parts in the relation which they hold when driving and Fig. 3 representing the section as seen in the opposite direction and showing the parts in the relation which they assume when the driven part is held from movement. Fig. 4 is a view similar to Fig. 1, but illustrating a different relative arrangement of some of the parts.

In the several figures of the drawings the driver or driving member is sufficiently illustrated or represented by the shaft $a$, the direction of rotation of such driver being indicated in each case by the arrow thereon. To the driver is applied a stiff spiral spring, which is of such form as to give a comparatively large bearing or friction surface for coöperation with a cylindrical driven part or member. The relation of the spiral spring to the cylindrical driven part with which it engages frictionally is such that the spring under normal conditions is in close frictional contact with the driven part and that when the driven part is held from rotation the continued rotation of the driver expands or contracts the spring with reference to the driven part, according to the form of such driven part, and therefore slips with reference to such driven part, so that the driver may continue to rotate. The frictional engagement of the spring with the driven part is sufficient under normal conditions to transmit to the driven part the required power. As illustrated in Figs. 1, 2, and 3, the coiled spring $b$ is crowded into a sleeve $c$, which represents the driven part, such sleeve being connected in any convenient manner to the mechanism to be driven, as by a shaft $d$. Normally the external diameter of the coiled spring $b$ is somewhat greater than the internal diameter of the sleeve $c$, so that the spring must be crowded into the sleeve and shall have such frictional contact or engagement therewith as to transmit to the driven part the required power, as above stated. The spring is connected to the driver, as by a pin $e$, and in this instance is coiled in a direction opposite to the direction of rotation of the driver $a$, so that when the driven member $c$ is held from rotation the continued rotation of the shaft will tend to wind the spring upon itself, contracting the diameter of the spiral and releasing the frictional engagement with the driven member $c$, thereby permitting the spring to slip with reference to the driven member. In the arrangement shown in Fig. 4 the cylindrical member instead of being formed as a sleeve is a cylindrical shaft $c'$, around which the coiled spring $b'$ fits snugly, the internal diameter of the coil being normally less than the diameter of the shaft. In this case the frictional engagement of the spring, which is connected with the driver $a$, as by a pin $e$, is sufficient under normal conditions to transmit the required power to the shaft $c'$ or driven member. The spring $b'$ in this form of the device is coiled in the same direction as the direction of rotation of the driver, so that when the driven member is held from rotation the continued rotation of the driver expands the spring away from the driven member, releasing the frictional engagement of the spring with the driven member and permitting the spring to slip with reference to said driven member.

It will be observed in each case that the normal relation between the diameter of the spring and the diameter of the driven part is such that the spring is in close frictional contact with the driven part and that the spring is coiled in such direction with reference to the direction of rotation of the driver that the tendency of the driver is to change the diameter of the spring with reference to the driven part, so as to release the spring from frictional engagement with the driven part. Otherwise the precise construction and arrangement of parts may be varied without departing from the spirit of the invention.

I claim as my invention—

A slipping clutch comprising a driver, a cylindrical driven part and a coiled spring secured to the driver and normally engaging said driven part frictionally and coiled in a direction to be released from frictional engagement with the driven part when the driven part is held from rotation, substantially as shown and described.

This specification signed and witnessed this 12th day of November, A. D. 1900.

BRADFORD H. LOCKE.

In presence of—
 A. N. JESBERA,
 W. B. GREELEY.